United States Patent [19]
Finch

[11] 4,424,470
[45] Jan. 3, 1984

[54] MOTOR CONTROL CIRCUIT FOR RADIO CONTROLLED MODELS

[76] Inventor: Robert A. Finch, 19575 W. Martin Dr., Mundelein, Ill. 60060

[21] Appl. No.: 352,230

[22] Filed: Feb. 25, 1982

[51] Int. Cl.³ .......................... H02P 5/16; H04Q 7/02

[52] U.S. Cl. .......................................... 318/6; 318/341; 340/825.63; 46/254

[58] Field of Search .......................... 318/16, 503, 341; 46/254; 340/825.63, 825.64, 825.69, 825.72

[56] References Cited

U.S. PATENT DOCUMENTS 4,143,307 3/1979 Hansen et al. ................. 340/825.63
4,309,645 1/1982 De Villenueve .................... 318/341

*Primary Examiner*—J. V. Truhe
*Assistant Examiner*—A. Evans
*Attorney, Agent, or Firm*—Spencer E. Olson

[57] ABSTRACT

The disclosed motor control device is responsive to control pulses received from a remote transmitter to provide switched duty cycle controlled power to the electric motor which drives the model, and provides neutral and fully proportional forward and reverse speeds while using only a single radio frequency channel. The controller is small in size and weight, is efficient, dissipates very little power, and employs no servo driven elements. The circuit is constructed to ensure motor shut-down in the event of loss of transmitter signal, or of receiver failure.

11 Claims, 3 Drawing Figures

MOTOR CONTROL CIRCUIT FOR RADIO CONTROLLED MODELS

BACKGROUND OF THE INVENTION

This invention relates generally to circuits for controlling electric motors and, more particularly, to an improved circuit for controlling the speed and direction of the motor in radio controlled models.

Of the many available types of systems used to control the speed of electric motors in radio controlled model boats and cars, the most common employs an electro-mechanical servo to move a multi-position switch or rheostat which places different values of resistance in series with the motor, and accomplishes the reversing function by mechanically linking the servo to switches to reverse the polarity of the voltage applied to the motor, or by use of multiple rheostats. A commercially available electronic system converts the control pulses received from a remote transmitter to a voltage which is applied to a power emitter follower device to drive the motor. Both systems have inherent disadvantages. Systems of the first type require two devices, the servo and the rheostat or switch device. When resistance is inserted in series with the motor, power is dissipated in the resistance element, wasting battery energy and generating considerable heat which can be difficult to dissipate when the equipment must be mounted in a confined area, as is the case in most models. Electronic controllers of the type briefly described above have the disadvantage that large amounts of power are dissipated in the emitter follower and thus requires a relatively large heat sink, making the system quite bulky, and, as in the rheostat system, difficult to cool in confined areas. Also, due to the inherent characteristics of high power bipolar transistors normally used as emitter followers in this application, the voltage supplied to the motor is reduced by one volt or more, which represents a large percentage for systems using batteries of six or less volts, and necessitates the use of higher supply voltages and a concommitant increase in the size and weight of the batteries, a serious disadvantage where space and weight carrying capability is limited. Additionally, currently available motor control systems, especially those of the servo type, lack the capability for turning off the motor in the event of loss of transmitter signal or receiver failure.

Accordingly, a primary object of the present invention is to provide an improved motor speed controller which eliminates the need for an electro-mechanical servo. Another object of the invention is to provide a motor speed controller which dissipates very little heat and delivers virtually all of the available power to the motor being driven. Still another object of the invention is to provide a controller for an electric motor which automatically turns off the motor in the event of loss of transmitter signal, or receiver failure.

SUMMARY OF THE INVENTION

Briefly, the motor speed controller according to the invention is adapted for use in commercially available radio controlled model systems of the type including a transmitter for transmitting recurring control pulses having a duration controllable by an operator and a receiver for receiving the control pulses. The improved control system, in response to the received control pulses, generates a reference pulse having a duration equal to the mean of the shortest and longest received pulse duration, compares the duration of each of the received control pulses with the duration of the reference pulse to produce a difference signal, in response to the difference signal generates a D.C. reference voltage having an amplitude proportional to the difference in durations of the received control pulse and the reference pulse, which causes a D.C. voltage to be switched on and off with a duty cycle proportionally responsive to the reference voltage and variable from 0% to 100%, and converts the switched D.C. voltage to a switched direct current for driving the motor. The system accomplishes the functions of neutral, and full proportional forward and reverse speed control using only one channel of the radio control system. The controller itself dissipates very little power and, therefore, delivers virtually all of the available battery voltage to the motor. It eliminates the need for an electro-mechanical servo to drive the control, thus making the control circuit very compact and battery efficient.

BRIEF DESCRIPTION OF THE DRAWINGS

Other objects, features and advantages of the invention will become apparent, and its construction and operation better understood, from the following detailed description, taken in conjunction with the accompanying drawings, in which.

DESCRIPTION OF THE PREFERRED EMBODIMENT

Figure 1:
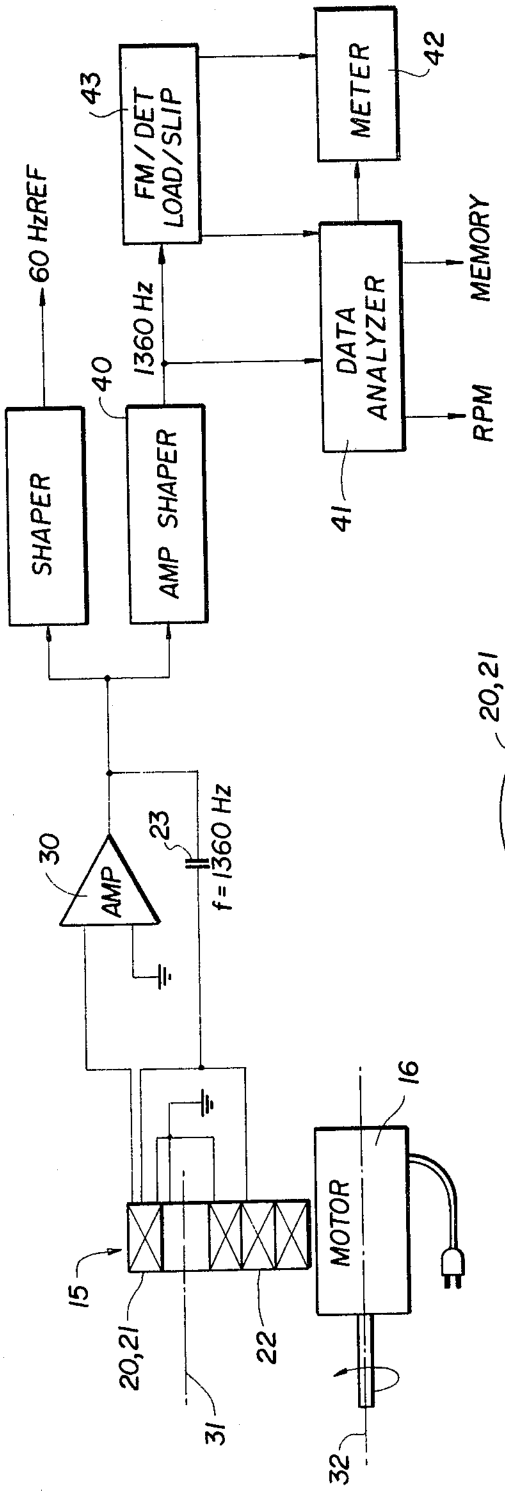
FIG. 1 is pictorial representation of a typical radio control system for models.

A typical radio control system for models, such as boats and cars, pictorially illustrated in FIG. 1, includes a radio transmitter (A), and a radio receiver (L) mounted in the model to be controlled, and adapted to receive control pulses over one or more channels for controlling the speed and direction of an electric motor contained in the model. The transmitter includes a circuit for generating a train of control pulses, the duration of which is controllable by an operator by manipulation of a control stick (B) projecting from the transmitter chassis. The pulses are separated by an amount in the range from 10 ms. to about 30 ms., depending on the particular transmitter. In typical commercially available transmitters, when the control stick is in its "neutral" position (F), the duration of the recurring control pulses is approximately 1.5 ms., as shown in waveform C in FIG. 1. When the stick is in its maximum "reverse" position (H), the width of the recurring pulses is approximately 1 ms., as shown in waveform D, and when the control stick is in its maximum "forward" position (G), the pulse width is approximately 2 ms., as depicted in waveform (E). When the control stick is moved from the "neutral" position to the maximum "reverse" position, the pulse duration is proportionally reduced from 1.5 ms. to 1 ms., and when it is moved in the opposite direction from "neutral", the pulse duration is proportionally increased from 1.5 ms. to 2 ms. The recurring series of control pulses, along with other control pulses in a serial pulse train, are used to modulate the radio frequency signal of the transmitter (A), which is transmitted by an antenna (J) to the receiver. The transmitted signal is received by the antenna (K) of the receiver (L), is detected in the receiver, and the output pulses, which correspond to the waveforms C, D and E are made available at a terminal (M) for application to one or more controlled devices contained in the model. In the present case only one control channel is required to control the speed and direction of the electric motor used to drive the model. Detailed description of the operation of radio controlled devices can be found in service manuals published for systems manufactured by Heath, Kraft, Ace, and others.

Figure 2:
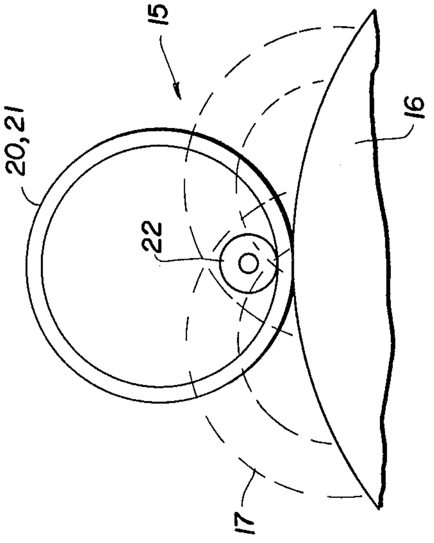
FIG. 2 is a schematic diagram of a preferred embodiment of the invention.

Referring now to FIG. 2, the received control pulses, the duration of which is variable over a range of 1 ms. to 2.0 ms. as determined by the operator at the transmitter, is applied to the input terminal of a trigger device 1, which desirably is one of six C-MOS Schmitt trigger devices contained in an integrated circuit Type 40106 commercially available from several manufacturers, including National Semiconducter and RCA. The trigger device 1 inverts the applied pulse, and a capacitor 2 and a resistor 3 connected to a source of positive potential, typically 4.8 volts, differentiates the inverted pulses, and the resulting narrow negative pulse is applied via a diode 4 to the input of a monostable multivibrator consisting of two Schmitt trigger devices 5 and 6 (which may be two others of the six contained on the chip with trigger 1), a capacitor 7 connected from the output of trigger 5 to the input of trigger 6, a resistor 8 connected from the output of trigger 6 to the input of trigger 5, and a variable resistor 9 connected between the input terminal of trigger 6 and a source of reference potential, shown as ground. The values of capacitor 7 and resistor 9 are selected to cause the output pulse generated by the multivibrator to have a pulse width of 1.5 ms. The inverted pulse at the output of trigger 1 is applied to the input of a Schmitt trigger 10 for providing at its output a non-inverted input pulse which is isolated from the input terminal.

The positive pulse appearing at the output of the trigger 10, and a negative pulse appearing at the output of trigger 6 of the multivibrator, are summed through equal-valued resistors 11 and 12, and the sum signal applied to the input of a Schmitt trigger 13, and also to the cathode of a diode 14. The resulting pulses at the cathode of diode 14 will be positive, as shown in waveform (A) of FIG. 3, or negative as shown in waveform (B) of FIG. 3, depending on the width of the received control pulse as compared to the 1.5 ms. pulse generated by the monostable multivibrator, and will have a width equal to the difference between the widths of the compared pulses. If the received control pulses and the pulse generated by the multivibrator have the same width, no pulse of either polarity will be present at the cathode of diode 14.

In like manner, the inverted (negative) input pulse appearing at the output of trigger 1 is summed with a positive 1.5 ms. pulse from the output of trigger 5 of the mutivibrator in a pair of equal-valued resistors and the sum applied to the cathode of a diode 15, the anode of which is connected to the anode of diode 14. The resultant pulse at the cathode of diode 15 will be the same as, but reversed in polarity from, that appearing at the cathode of diode 14.

Figure 3:
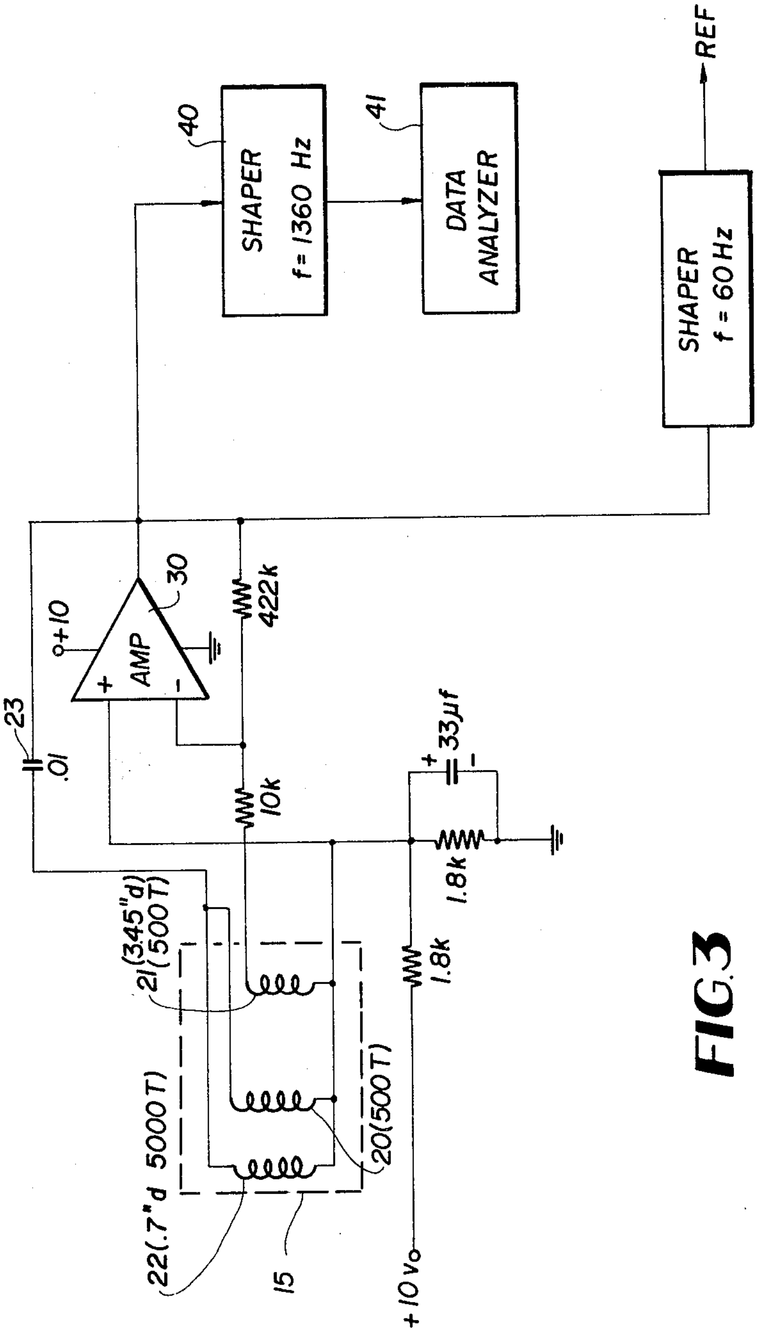
FIG. 3 is a series of waveforms useful to an understanding of the operation of the circuit of FIG. 2.

The anodes of diodes 14 and 15 are connected through a resistance-capacitance network to the base electrode of a transistor 16, and by virtue of the polarity of the diodes, the negative pulses applied to diodes 14 and 15 are applied to the base of transistor 16, and appear at the collector electrode of the transistor as positive pulses, depicted in waveform C of FIG. 3. Therefore, a positive pulse is generated at the collector of transistor 16 for each received control pulse that is either shorter or longer than 1.5 ms.; no pulses will appear at the collector of transistor 16 when the duration of the received control pulse is equal to 1.5 ms.

Negative 1.5 ms. pulses from the output of trigger 6 of the multivibrator are applied via a diode to the input of another Schmitt trigger 17, which is connected to a source of positive potential, typically having a value of 4.8 volts, through a resistor 18, and through a capacitor 19 to ground. The output of trigger 17 remains at 4.8 volts as long as pulses occur, and for a period of approximately 50 ms., as determined by the time constant of resistor 18 and capacitor 19, following the last occurring pulse. When pulses no longer occur, due to transmitter or receiver failure, the output of trigger 17 will switch to zero volts. Thus, trigger 17 provides a D.C. output potential of either 0 volts or +4.8 volts, which is applied via a resistor to the input of a Schmitt trigger 20. When the output of trigger 17 is +4.8 volts (indicating the presence of received control pulses), the output of trigger 20 is low. Positive received control pulses from the output of trigger 10 and positive multivibrator pulses from the output of Schmitt trigger 5 are combined in an "OR" gate consisting of diodes 21 and 22 to produce a narrow negative pulse which is applied through a capacitor 23 to the input of trigger 20, which generates a short positive pulse at its output when both the received control pulse and the multivibrator pulse have terminated, i.e., returned to zero volts.

The positive pulses produced at the collector of transistor 16 are used to charge a relatively large capacitor 26 through a resistor 25, the values of resistor 25 and capacitor 26 being so chosen that a pulse width of 0.5 ms. will charge the capacitor to approximately 2.2 volts, as depicted in waveform (D) of FIG. 3; narrower pulses will charge capacitor 26 to some lesser voltage, as illustrated in waveform (E) of FIG. 3. The narrow positive pulses produced at the output of Schmitt trigger 20, shown in waveform (F) of FIG. 3, are applied to the control terminal of a C-MOS bilateral switch 27, which may be part of a Type 4016 or 4066 integrated circuit, commercially available from several sources. These narrow pulses close the switch, and since they occur precisely at the end of the charging of capacitor 26 by transistor 16 and resistor 25, approximately 90% of the charge stored in capacitor 26 is transferred to a relatively smaller capacitor 28 before capacitor 26 can be discharged by resistors 24 an 25.

The ungrounded terminal of capacitor 28 is connected to the non-inverting input terminal of an operational amplifier 29, which may be one section of a dual bi-FET operational amplifier Type LF353, commercially available from National Semiconductor, or equivalent. Because this device has extremely high input impedances, the charge on capacitor 28 will remain for a long period (many seconds) without change, except when it is connected to capacitor 26 by switch 27; thus, the voltage charge on capacitor 26, which is proportional to the width of the received control pulses, is sampled each time the received control pulse occurs by the so-called "sample and hold" circuit consisting of bi-lateral switch 27, capacitor 28 and bi-FET operational amplifier 29.

The gain of operational amplifier 29 is adjusted to be approximately 2.5, thereby causing the voltage produced at its output terminal to be between zero volts and +4.8 volts and to be directly proportional to the width of the resultant pulses supplied by transistor 16. The essentially constant voltage appearing at the output of amplifier 29 is applied as a reference voltage to the non-inverting input terminal of the other section 30 of the duel bi-FET operational amplifier, which is connected as a comparator and energized from +9 volts and −4 volts sources.

Another Schmitt trigger 31 having a resistor 32 connected from its output to its input, a capacitor 32 connected from its input to ground, and its output connected through a capacitor 34 and a resistor 35 to ground, comprises a square wave oscillator having a frequency of approximately 150 Hz and an amplitude of 4.8 volts, as illustrated in waveform (G) of FIG. 3. The 150 Hz square wave signal is differentiated by capacitor 34 and resistor 35 and the differentiated signal is applied to the input of a Schmitt trigger 36; the outut of trigger 36 is connected to the cathode of a diode 39 whose anode is connected to the ungrounded terminal of a capacitor 38. A transistor 37 having its base electrode connected to a +4.8 volt source, its emitter electrode connected through a variable resistor to a +9 volts source and its collector electrode connected through a resistor to the ungrounded terminal of capacitor 38, functions as constant current source for charging capacitor 38, the charge on which will increase linearly with time from +0.6 volts to +4.8 volts; the capacitor 38 is discharged by negative pulses fom Schmitt trigger 36, depicted by waveform (J) of FIG. 3, via the diode 39, causing a sawtooth wave having a frequency of approximately 150 Hz to be generated.

The sawtooth wave appearing at the junction of diode 39 and capacitor 38 is applied through a resistor to the inverting terminal of operational amplifier 30. When the amplitude of the sawtooth voltage exceeds the reference voltage generated by operational amplifier 29, the output of amplifier 30 will be −4 volts; however, when the reference voltage exceeds the sawtooth voltage amplitude, the output of comparator 30 wil be +9 volts. These relationships are shown in waveforms (K,L) (M,N) of FIG. 3. The output of comparator 30 is a train of rectangular pulses whose excursion is between −4 volts and +9 volts, whose duty cycle is automatically variable in direct proportion to the amplitude of the reference voltage which, in turn, is proportional to the variations in pulse width of the received control pulses; thus, the duty cycle can be varied from 0% to 100% from the transmitter. The output of comparator 30 is applied to the gate terminal of a power FET device 51, which may be any of a number of commercially available types of which the Motorola MTP1224 is one example; while a single power FET is illustrated, two or more such devices may be connected in parallel. The source terminal of the FET is connected to the negative side of both the battery 50, the power source for the motor, and the circuit supply, and the drain electrode is connected via the contacts of a relay 43 to one terminal of the motor 49, the other terminal of the motor being connected via the contacts of relay 43 to the positive side of the motor battery. A characteristic of power FET devices that make them particularly useful in this application is the low resistance between source and drain when the device is on, and that a plurality of such devices may be connected in parallel to provide even lower switched output resistance, to further minimize power dissipation in the devices. The type and number of FET devices to be used is determined by the current requirements of the motor 49 to be driven. It will be evident that the FET device (or devices) operates as a switch connected in series with the motor battery 50 and the motor 49, thereby to switch the motor current on and off at the duty cycle of the positive pulses delivered by comparator 30. A pair of rectifier diodes 40 and 41 respectively connected from the drain electrode to ground and to the positive terminal of the battery 50 prevent inductive impulses from damaging the power FET device, or devices, if more than one is used.

Control of the direction of motor 49 is achieved by applying the output of Schmitt trigger 13 to the base electrode of a transistor 42, the emitter electrode of which is connected to ground and the collector electrode of which is connected through the coil of relay 43 to a source of positive potential, typically +4.8 volts. The contacts of the relay are connected to reverse the motor terminal connections for forward and reverse directions. A pair of diodes 44 and 45 respectively connected between the emitter and collector electrodes of transistor 42, and between the collector electrode and the positive voltage source, suppress inductive impulses. As is seen from waveforms (A) and (B) of FIG. 3, since the nominal voltage at the input of Schmitt Trigger 13 is 2.4 volts, trigger 13 will switch its condition only when the duration of the received control pulses is less than or more than 1.5 ms. Thus, the relay will switch "on" for the reverse function, and will switch "off" for the forward direction, the switching occurring when the control stick on the transmittor is very close to its neutral (or "off") position, at which time the current applied to motor 49 is at or very near to zero.

In the event of loss of received control pulses, due to either transmitter or receiver failure, the output of Schmitt trigger 17 will switch to zero volts, forcing the output of trigger 20 to +4.8 volts which, in turn, closes bilateral switch 27 and allows capacitor 28 to discharge fully until charging pulses are again supplied to capacitor 26, resulting in motor turn-off.

In order to eliminate the need for power sources other than the +4.8 volts needed for and normally available in the radio receiver, and yet provide the +9 volts and −4 volts required for the bi-FET operational amplifiers 29 and 30 and the current source transistor 37, the +4.8 volts available from the receiver circuit is applied to a power inverter of known design. The power inverter shown at the lower right hand corner of FIG. 2 includes a Schmitt trigger device 46, a pair of transistors 47 and 48, and associated components connected to produce output voltages of +9 volts and −4 volts for application as required to the circuit of FIG. 2.

I claim:

1. In a system for the radio control of motor driven models including a transmitter for transmitting a recurring control pulse having a duration controllable by an operator within a predetermined range and a receiver for receiving said control pulses, a motor control circuit at said receiver comprising:

reference pulse generating means responsive to received control pulses for producing a reference pulse having a predetermined duration between the shortest and longest received pulse duration;

means for comparing the duration of each of said received control pulses with the duration of said reference pulse and producing a difference signal;

means including sample and hold circuit means for producing in response to said difference signal a D.C. reference voltage having an amplitude proportional to the difference in durations of said received control pulses and said reference pulse;

means including means for producing a sawtooth voltage and means for comparing said sawtooth voltage with said D.C. reference voltage for producing a D.C. voltage switched on and off with a duty cycle proportionally responsive to said D.C. reference voltage and variable from 0% to 100%; and output means adapted to be connected in series with an electric motor and a D.C. voltage source for converting said switched D.C. voltage to switched direct current for driving the motor.

2. A motor control circuit according to claim 1, wherein said reference pulse generating means is a monostable multivibrator.

3. A motor control circuit according to claim 1, wherein said comparing means is a resistor summing network.

4. A motor control circuit according to claim 1, wherein said reference voltage generating means further includes a first capacitor connected to be charged to a voltage proportional to said difference signal, and wherein said sample and hold means is operative to store the charge on said first capacitor and includes a second capacitor, a current switch connecting said first capacitor to said second capacitor for sampling at the rate of said received control pulses the voltage charge on said first capacitor, and a high input impedance operational amplifier connected to receive the voltage charge transferred by said switch to said second capacitor.

5. A motor control circuit according to claim 1, wherein said means for producing said switched D.C. voltage comprises:

means for generating a square wave voltage having a repetition rate of approximately 150 Hz;

means for converting said square wave voltage to a sawtooth voltage; and an operational amplifier having first and second input terminals connected to receive said sawtooth voltage at one input terminal and to receive said D.C. reference voltage at the other input terminal for comparing said sawtooth voltage with said D.C. reference voltage.

6. A motor control circuit according to claim 1, wherein said output means comprises at least one power FET device.

7. A motor control circuit according to claim 1, wherein said circuit further comprises:

relay means for connecting said output means to said motor and operative when deenergized to drive said motor in a first direction of rotation and operative when energized to reverse the polarity of current applied to the motor and the direction of rotation thereof, and means coupled to said comparing means for energizing said relay means responsively to said received control pulse having a shorter duration than said reference pulse and for deenergizing said relay means responsively to said received control pulse having a longer duration than said reference pulse.

8. A motor control circuit according to claim 7, wherein said relay means is an electromechanical relay having an electrically energized coil and mechanical contacts connected between said output means and said motor.

9. A motor control circuit according to claim 1 or 7, wherein said circuit further includes means responsive to the absence of received control pulses for turning said motor off and comprising:

means for detecting the presence of said reference pulses, and timed switching means connected to said reference voltage generating means for disabling said reference voltage generating means when no reference pulses are detected by said detecting means.

10. A motor control circuit according to claim 1 or 7, wherein the duration of said received control pulses is variable over a range from 1 ms to 2 ms, and wherein said reference pulse generating means produces a reference pulse having a duration equal to the mean of the shortest and longest received pulse duration.

11. In a system for the radio control of motor driven models including a transmitter for transmitting a recurring control pulse having a duration controllable by an operator within a predetermined range and a receiver for receiving said control pulses, a motor control circuit at said receiver comprising:

means responsive to received control pulses for producing a reference pulse having a duration between the shortest and longest received pulse duration;

means for comparing the duration of each of said received control pulses with the duration of said reference pulse and producing a difference signal;

means for producing in response to said difference signal a D.C. reference voltage having an amplitude proportional to the difference in durations of said received control pulses and said reference pulse;

means for producing a D.C. voltage switched on and off with a duty cycle proportionally responsive to said D.C. reference voltage, including means for generating a square wave voltage having a predetermined repetition rate, means for converting said square wave voltage to a sawtooth voltage, and an operational amplifier having first and second input terminals connected to receive said sawtooth voltage at one input terminal and to receive said D.C. reference voltage at the other input terminal for comparing said sawtooth voltage with said D.C. reference voltage; and output means adapted to be connected in series with an electric motor and a D.C. voltage source for converting said switched D.C. voltage to switched direct current for driving the motor.

* * * * *

UNITED STATES PATENT AND TRADEMARK OFFICE

CERTIFICATE OF CORRECTION

PATENT NO. : 4,424,470 Page 1 of 4

DATED : January 3, 1984

INVENTOR(S) : Robert A. Finch

It is certified that error appears in the above-identified patent and that said Letters Patent is hereby corrected as shown below:

The title page should be deleted to appear as per attached title page.

The sheets of Drawings consisting of Figures 1-3 should be deleted to appear as per attached sheets consisting of Figures 1-3.

Column 4, line 50, "an" should be --and--.

Column 5, line 6, "duel" should be --dual--.

line 18, "outut" should be --output--.

Signed and Sealed this

*Thirtieth* Day of *October 1984*

[SEAL]

*Attest:*

GERALD J. MOSSINGHOFF

*Attesting Officer* *Commissioner of Patents and Trademarks*

United States Patent [19] | [11] 4,424,470
Finch | [45] Jan. 3, 1984

[54] MOTOR CONTROL CIRCUIT FOR RADIO CONTROLLED MODELS

[76] Inventor: Robert A. Finch, 19575 W. Martin Dr., Mundelein, Ill. 60060

[21] Appl. No.: 352,230

[22] Filed: Feb. 25, 1982

[51] Int. Cl.[3] .......................... H02P 5/16; H04Q 7/02

[52] U.S. Cl. ....................................... 318/6; 318/341; 340/825.63; 46/254

[58] Field of Search .......................... 318/16, 503, 341; 46/254; 340/825.63, 825.64, 825.69, 825.72

[56] References Cited

U.S. PATENT DOCUMENTS 4,143,307 3/1979 Hansen et al. ................ 340/825.63
4,309,645 1/1982 De Villenueve .................... 318/341

*Primary Examiner*—J. V. Truhe
*Assistant Examiner*—A. Evans
*Attorney, Agent, or Firm*—Spencer E. Olson

[57] ABSTRACT

The disclosed motor control device is responsive to control pulses received from a remote transmitter to provide switched duty cycle controlled power to the electric motor which drives the model, and provides neutral and fully proportional forward and reverse speeds while using only a single radio frequency channel. The controller is small in size and weight, is efficient, dissipates very little power, and employs no servo driven elements. The circuit is constructed to ensure motor shut-down in the event of loss of transmitter signal, or of receiver failure.

11 Claims, 3 Drawing Figures

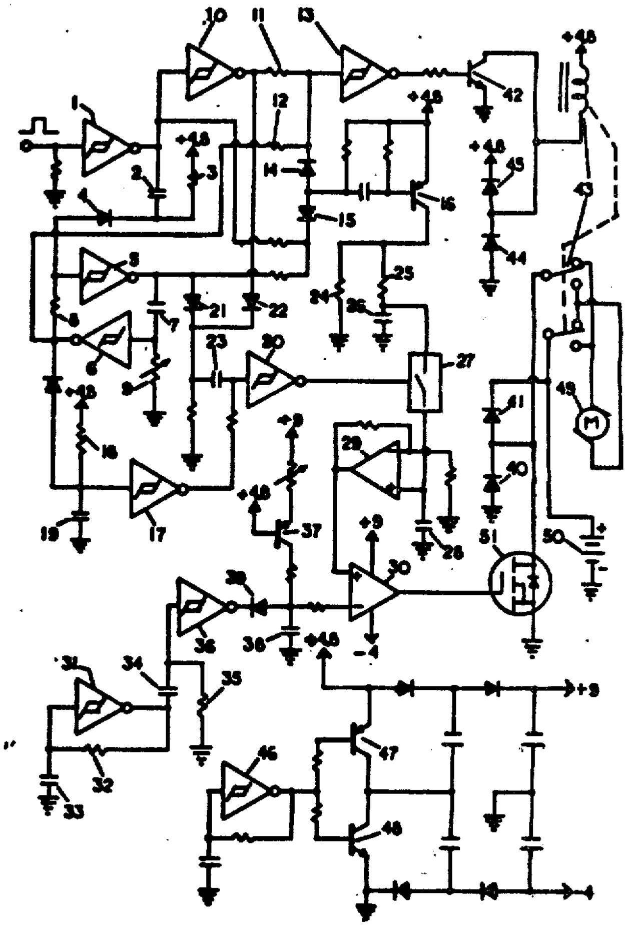

UNITED STATES PATENT AND TRADEMARK OFFICE

CERTIFICATE OF CORRECTION

PATENT NO. : 4,424,470

DATED : January 3, 1984

INVENTOR(S) : Robert A. Finch

It is certified that error appears in the above-identified patent and that said Letters Patent are hereby corrected as shown below:

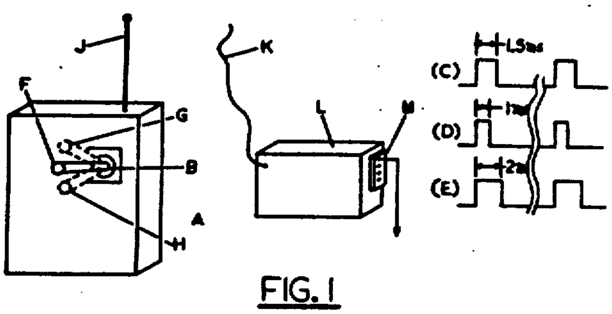

FIG. 1

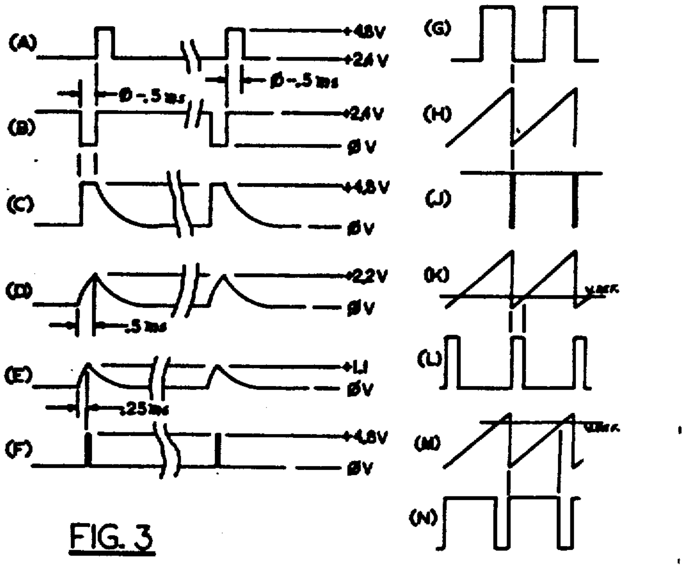

FIG. 3

UNITED STATES PATENT AND TRADEMARK OFFICE
CERTIFICATE OF CORRECTION

PATENT NO. : 4,424,470

DATED : January 3, 1984

INVENTOR(S) : Robert A. Finch

It is certified that error appears in the above-identified patent and that said Letters Patent are hereby corrected as shown below:

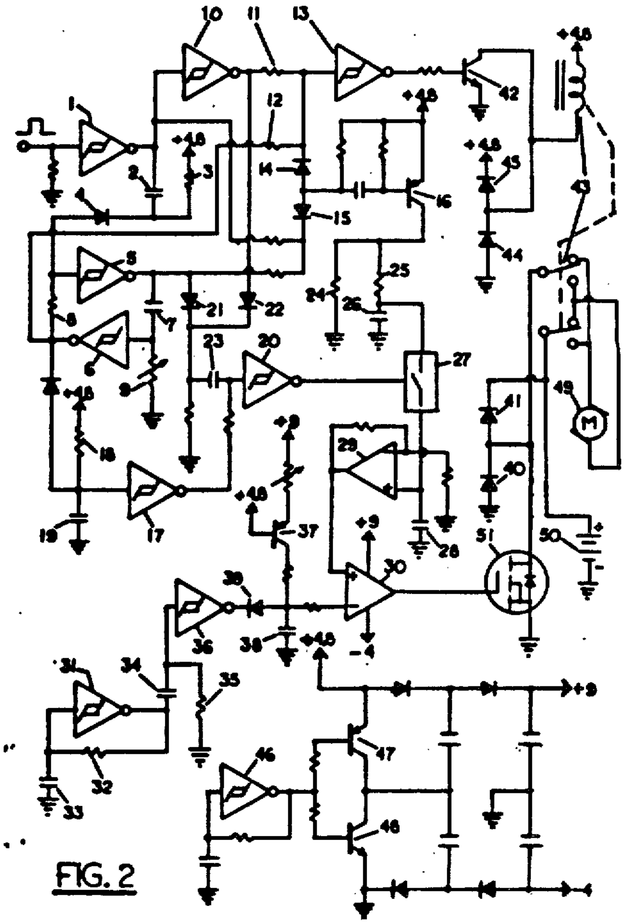

FIG. 2